United States Patent [19]

Smith

[11] Patent Number: 4,597,378
[45] Date of Patent: Jul. 1, 1986

[54] SOLAR ENERGY COLLECTOR AND GLAZING SYSTEM

[76] Inventor: William F. Smith, 353 DeSoto Dr., New Smyrna Beach, Fla. 32069

[21] Appl. No.: 531,406

[22] Filed: Sep. 12, 1983

[51] Int. Cl.⁴ .............................. F24J 2/46; F24J 2/00
[52] U.S. Cl. ..................................... 126/450; 126/417
[58] Field of Search ................ 126/417, 450, 447, 901

[56] References Cited

U.S. PATENT DOCUMENTS

| | | | |
|---|---|---|---|
| 4,026,268 | 5/1977 | Bartos et al. | 126/445 |
| 4,062,346 | 12/1977 | Rapp, Jr. et al. | 126/449 |
| 4,099,517 | 7/1978 | McRae | 126/450 |
| 4,131,111 | 12/1978 | Hopper | 126/450 |
| 4,153,981 | 5/1979 | Stuppy | 24/243 X |
| 4,170,223 | 10/1979 | Weideman | 126/400 |
| 4,178,909 | 12/1979 | Goolsby et al. | 126/417 |
| 4,191,169 | 3/1980 | Hyman | 126/444 |
| 4,205,658 | 6/1980 | Clark | 126/444 |
| 4,215,675 | 8/1980 | Embree | 126/450 |
| 4,252,103 | 2/1981 | Carter et al. | 126/446 |
| 4,266,383 | 5/1981 | Krueger et al. | 126/450 |
| 4,278,074 | 7/1981 | Uroshevich | 126/444 |
| 4,308,858 | 1/1982 | Skillman | 126/418 |
| 4,378,788 | 4/1983 | Naccache | 126/435 |
| 4,404,962 | 9/1983 | Zinn et al. | 126/450 |
| 4,406,279 | 9/1983 | Kohli | 126/450 |

FOREIGN PATENT DOCUMENTS 2385930 10/1978 France ................ 126/450

OTHER PUBLICATIONS

"Teflon" Solar Film—E. I. Du Pont de Nemours & Co. (Inc.), Plastics & Resins Department.

Primary Examiner—Samuel Scott
Assistant Examiner—H. A. Odar
Attorney, Agent, or Firm—William F. Smith

[57] ABSTRACT

A solar device having at least two glazings wherein the inner glazing is a film stretched, positioned and held in place by internal tenter strips in cooperation with pressure uniformly exerted by the outer glazing. The device has plastic structural components to achieve a low k value.

6 Claims, 8 Drawing Figures

SOLAR ENERGY COLLECTOR AND GLAZING SYSTEM

BACKGROUND OF THE INVENTION

1. Field of the Invention

This invention relates to solar collectors and more particularly to a new and improved solar collector having component parts of low k value (thermal conductivity BTU/hr/FT Sq/°F./in) and multiple glazings.

2. Description of the Prior Art

Prior art solar collectors suffer from a high k value since generally aluminum or stainless steel is used as the frame structure. When dual glazings are used for high efficency, the inner glazing is generally supported independently and spaced from the outer glazing. This increases the gross depth of the frame. An increase in frame depth decreases the value of dual glazing due to increased radiation loss caused by increased mass in the frame structure. Additionally, shadow effect on the absorber plate due to increased height above the absorber causes solar insolation loss. It will be appreciated that the loss due to shadows on the absorber plate is greater than the simple geometrical loss of solar insolation, since forced circulation of fluid into the shaded region of the plate continues to deliver heat to this cooler portion, resulting in a negative contribution to net energy delivered.

The publication entitled "TEFLON SOLAR FILM for Solar Collectors" by DU PONT identified as E-21605 8/78, disclosed TEFLON as an inner glazing with an outer glazing of Lucite acrylic, TEDLAR PVF, or glass. The outer glazing was substantially flat and the inner glazing of TEFLON was independently suspended and spaced from the outer glazing and absorber thereby requiring an increased depth of the frame. The DU PONT publication further disclosed a 1% stretch applied during installation is recommended and will reduce sag during stagnation. And that sag does not generally affect the performance of the collector since the TEFLON film does not stick to the collector plate (absorber) and reestablishes its original position when the plate is cooled to normal use temperature. The DU PONT publication further disclosed several methods for stretching the TEFLON film to remove wrinkles as well as use of a tenter frame to stretch and reduce wrinkles.

The present invention meets the need for an improved flatplate solar collector in that it has the advantages of low k value by use of plastic materials for the housing in lieu of a metal frame. As a further advantage, it is designed to provide a dual glazing for the collector with a minimal increase in gross frame depth thereby minimizing shadow loss and it is designed for the facile and economical installation of film material as the inner glazing.

SUMMARY OF THE INVENTION

Accordingly, a primary object of the present invention is to provide a solar device having at least two glazings wherein the inner glazing is a film stretched, positioned and held in place by internal tenter strips in cooperation with pressure uniformly exerted by a superposed member.

Another object of the present invention is to provide a solar collector having an integral plastic housing of low k value as the frame supporting internal tenter strips in contact with a glazing film stretched, positioned and held in place by the tenter strips.

Another object of the present invention is to provide a solar collector having a dual glazing in which the inner glazing is a film which has been stretched, positioned and held in place with a minimal increase in gross frame depth.

Other objects and advantages of this invention reside in the construction of parts, the combination thereof, the method of manufacture, and the mode of assembly, as will become more apparent from the following description.

BRIEF DESCRIPTION OF THE DRAWINGS

A more complete appreciation of the invention and many of the attendant advantages thereof will be readily obtained by reference to the following detailed description when considered in connection with the accompanying drawings, wherein.

DETAILED DESCRIPTION OF THE PREFERRED EMBODIMENT

Figure 1:
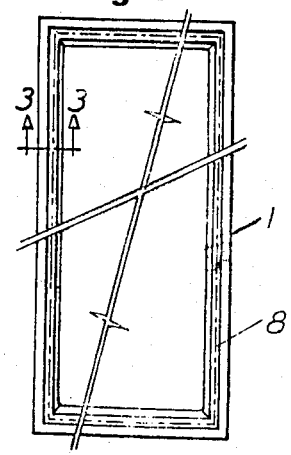
FIG. 1 is a top view of the integral plastic housing.
Figure 3:
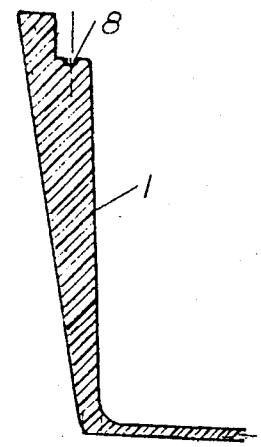
FIG. 3 is an enlarged fragmentary sectional view taken substantially on line 3—3 of FIG. 1.
Figure 2:
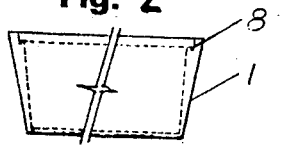
FIG. 2 is an end view of the housing depicted in FIG. 1.

With reference to FIGS. 1, 2 and 3, housing 1 is an integral body of fiberglass-reinforced plastic (FRP) adapted to contain and support essential elements of a solar collector. The size of standard solar collectors is usually 2 to 4 ft. in width, 6 to 10 ft. in length and 3 to 6 inches in gross depth. The collector described herein is about 4 ft. (1.22 m) wide, 8 ft. (2.44 m) long and 4 inches (0.10 m) deep. The housing 1 has a shoulder for glazing, is thickest in the area of highest heat confined above the absorber, and is suitably penetrated (not shown) to accommodate standard absorber plates for ingress and egress of fluid medium.

Figure 4:
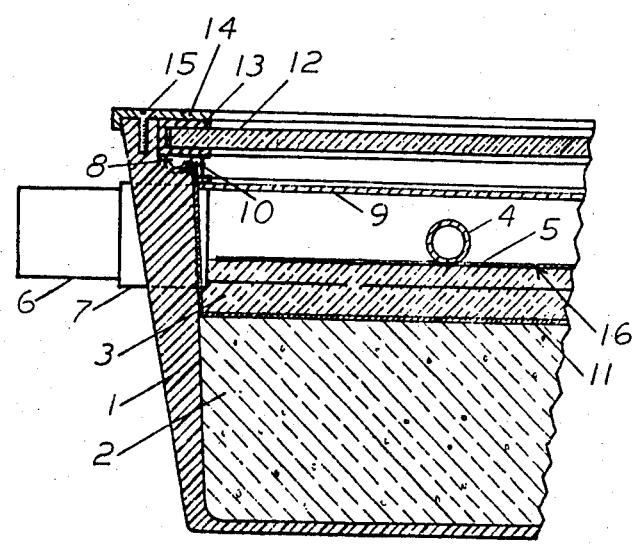
FIG. 4 is a fragmentary sectional end view depicting the various elements of the invention.
Figure 5:
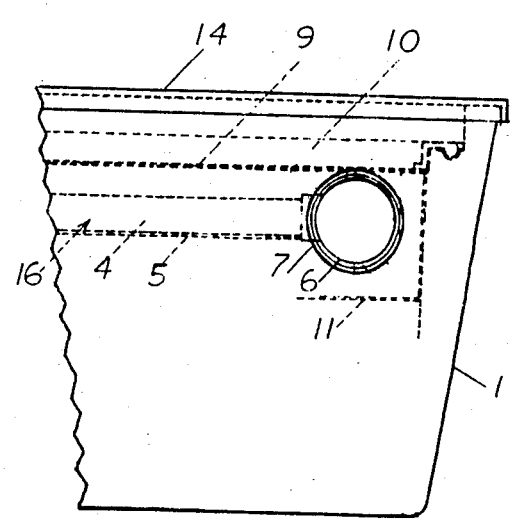
FIG. 5 is a fragmentary side view depicting key elements of FIG. 4.

Referring now to FIGS. 4 and 5 described in the order of assembly, insulation 2 is glass-reinforced polyisocyanurate which has been formed in place within the housing 1. Reflective aluminum foil 11 is placed over insulation 2 and extends up the side of housing 1 above the absorber 16 with the reflective side facing inwardly as a heat mirror to reflect back internally generated heat from the housing wall. Insulation 3 is glass fiber batt free of binder and oil and is placed over foil 11 in contact with absorber 16 to reduce any tendency for offgas under abnormal conditions. Absorber plate 16 comprises copper tube 4, copper fin 5 and copper header 6 as a preformed absorber with the tubes and fins thereof selectively coated. Header gasket 7 is an EPDM cylindrical gasket secured in place with silicon adhesive/sealant.

Figure 6:
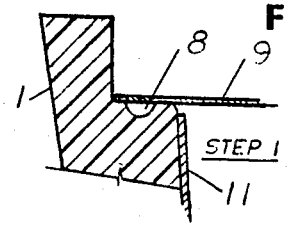
FIGS. 6, 7, 8 are enlarged sectional views showing assembly steps 1,2 and 3 for ultimately securing the glazing film and reflective foil.
Figure 7:
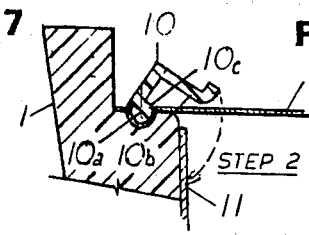
Figure 8:
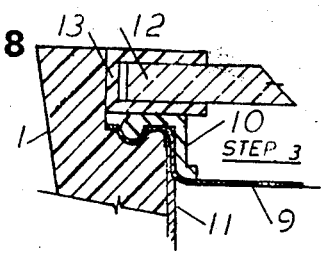

Referring now more particularly to FIG. 6, housing 1 has a groove 8 in the shoulder thereof. Inner glazing 9 of TEFLON film is superposed on the entire glazing shoulder of housing 1 thereby covering the groove 8. Referring now to FIG. 7, tenter strip 10 of rigid FRP and of substantially right angle sectional configuration has a ball-like cross-section 10a at one side thereof and a smooth contact profile arm 10b at the other. The ball-like section 10a of tenter strip 10 is pressed over the TEFLON film and into the groove 8 to thereby secure the film and form a hinged connection. The other side of tenter strip 10 is in close proximity or slight contact with TEFLON 9. Referring now to FIG. 8, outer glazing 12 of glass with glazing gasket 13 of EPDM is lowered on the entire glazing shoulder of housing 1 in an even manner. This uniformly presses the hinged tenter strip 10 downwardly with the lower side 10b in contact with TEFLON 9 to stretch, position and secure the TEFLON uniformly as the inner glazing. The ball-like section 10a of tenter strip 10 is slightly eccentric with an increase in radius at 10c to insure an increased gripping action within the hinged joint during downward travel of the tenter strip. A plurality of the tenter strips may be used in substantially equal lengths and widths of the collector or may be used in segments. Foil 11 extends up the side of housing 1 and is secured in place behind TEFLON 9 due to the action of tenter strip 10 which serves to secure both TEFLON film 9 and reflective aluminum foil 11. Returning to FIGS. 4 and 5, glazing strip 14 of rigid FRP is secured to housing 1 by a plurality of rust-proof screws 15.

It is evident that there are numerous factors which will influence conditions for the most satisfactory operation of the invention, the actual limits of which are determined by the raw materials and the intermediate and the finished products desired.

A preferred composition for housing 1 is FRP formed from thermoset bulk molding compound (BMC) containing from about 15 to about 35% glass fiber by weight. This gives a high strength product with a low k value from about 1.3 to about 1.7. Similarly, the preferred composition for tenter strip 10 and glazing strip 14 is FRP formed from thermoset sheet molding compound (SMC) containing from about 15 to about 30% glass fiber by weight. The physical shape and tolerance of tenter strip 10 and glazing strip 14 dictates continuous pultrusion for these parts to insure structural integrity. Heat distortion for the BMC and SMC compounds at 264 psi is in the range of 400°-500° F. The FRP compounds may be further improved for extreme service by the addition of from about 10 to about 20% by weight of graphite. The preferred resins for the BMC and SMC compounds are the polyesters and epoxies.

A preferred material for insulation 2 is glass-reinforced polyisocyanurate foamed in place. Polyurethane foam and polyisocyanurate foam per se, having low k values, are also suitable. The preferred material for insulation 3 is glass fiber batt with no binder or oil, having a density of from about 1.5 to about 4.5 pounds per sq.ft. and a k value in the order of about 0.25 at 150° F. mean temperature. Placing insulation 3 subjacent and in contact with absorber 16 gives the insulation system resiliency while minimizing the risk of outgassing.

Absorber 16 has copper tubes welded to copper fins and has a selective coating of black chrome. Copper, aluminum and stainless steel are metals commonly used as absorbers in collectors designed primarily for hot water (intermediate temperature range). In each instance, however, improvement in performance results from the use of a selective absorber coating on these metals as compared to modified selective coatings or black paints. UV stabilized ABS, UV stabilized EPDM, and UV stabilized polypropylene are plastics containing carbon black commonly used as absorbers in collectors designed primarily for pool heating (low temperature range). Collectors for pools in practically all instances, do not use glazings. However, in instances where pool absorbers are used in collectors to serve the intermediate temperature range, glazings are used and double glazings enhance performance. Accordingly, another embodiment of this invention provides a solar collector to serve low, intermediate and high temperature ranges. This is accomplished by the dual glazings heretofore set forth in combination with a graphite fiber absorber panel in lieu of the copper tube and fin absorber 16. The graphite panel is of overall waffle design providing maximum wetted heat transfer area. Copper panels with two copper sheets bonded together having the waffle design have heretofore been used and were initially designed by Olin Brass, East Alton, Ill. for solar pool heaters. Graphite panels with two graphite fabric sheets bonded together in conjunction with polyester, vinyl ester, epoxy, and other resin systems yields a waffle absorber of outstanding structural and high temperature characteristics.

A preferred material for inner glazing 9 is fluorinated hydrocarbons (TEFLON) in view of its 96% solar transmission, light weight, refractive index 1.34, thinness from about 1 to about 3 mils, and maximum continuous service temperature of 400° F. Although the thermal expansion coefficient of TEFLON is quite high, the internal tenter mechanism of the present invention substantially eliminates the problem of external handling of the thin film material to effect stretching and freedom from wrinkles.

Tenter strip 10 is designed so that the plurality of strips required imparts uniform stretch to the TEFLON 9 throughout its surface as the tenter strips are forced downwardly as depicted in FIGS. 7 and 8. Since the amount of stretch is in the order of 1% the downwardly thrusting leg of tenter strip 10 is dimensioned to obtain the 1% stretch when the superposed glazing 12 is uniformly lowered thereon and fully seated. Dimensioning of the tenter strips may be varied as required for the ends and sides. With the glazing 12 fully seated and glazing strips 15 secured, TEFLON 9 and reflective aluminum foil 11 are locked in place by tenter strip 10 as depicted in FIG. 8.

The outer glazing 12 is tempered glass, 0.01% iron oxide and 0.48 cm thick. Other glazings may be used such as acrylic plastic (LUCITE and PLEXIGLAS) which has established longevity as an outer glazing. The plastics when used should be bowed slightly and/or ribbed to add rigidity. This gives an increase in space between TEFLON 9 and the plastic glazing and gives additional heat protection.

Having now fully described the invention, it will be apparent to one skilled in the art that many changes and modifications can be made thereto without departing from the spirit or scope of the invention as set forth herein.

What I claim and desire to protect by Letters Patent is:

1. In a solar collector having a housing, an absorber and at least two glazings in which the inner glazing is a film, wherein the improvement comprises:

said housing supporting a glazing shoulder;

a plurality of tenter strips, of substantially right angle sectional configuration having a ball-like cross-section at one side thereof and a smooth contact profile arm at the other side thereof, a plurality of grooves formed in said glazing shoulder in which said tenter strips rest, disposed within said tenter strips said housing having the ball-like side thereof in hinged connection with said grooves to secure the film therebetween and the smooth contact side thereof extending downwardly in an initial position for contact with the film, and an outer glazing is uniformly superposed on the hinged tenter strips to uniformly press the tenter strips downwardly to a final position for the smooth contact side thereof to contact the film and stretch, position and secure the film as the inner glazing.

2. The collector of claim 1, wherein the housing has a housing wall comprising a thermosetting material having an upwardly diverging cross-section with its thickest portion in the area of highest heat confined above the absorber.

3. The collector of claim 1, wherein the ball-like section of the tenter strips is slightly eccentric to insure an increased gripping action within the hinged connection during downward travel of the tenter strips.

4. The collector of claim 1, wherein downwardly pressed tenter strips are dimensioned to obtain a uniform stretch of about 1% for the inner glazing film.

5. The collector of claim 2, wherein reflective foil facing inwardly to reflect back internally generated heat from the housing wall extends into the area of highest heat confined above the absorber and is secured in place with the film by the tenter strips.

6. In a solar device having a housing and at least two glazings in which the inner glazing is a film, wherein the improvement comprises:

said housing supporting a glazing shoulder;
a plurlaity of tenter strips, of substantially right angle sectional configuration having a ball-like cross-section at one side thereof and a smooth contact profile arm at the other side thereof, a plurality of grooves formed in said glazing shoulder in which said tenter strips rest, said tenter strips disposed within said housing having the ball-like side thereof connected to said grooves to hinge the tenter strips and secure the film therebetween and the smooth contact arm thereof extending downwardly for contact with the film, and an outer glazing uniformly superposed on the tenter strips to press the hinged tenter strips downwardly for the contact arm thereof to contact the film and stretch, position and secure the film as the inner glazing.

* * * * *